March 29, 1938.  H. M. DODGE  2,112,737
SURGICAL DRAINAGE TUBE
Original Filed June 8, 1934
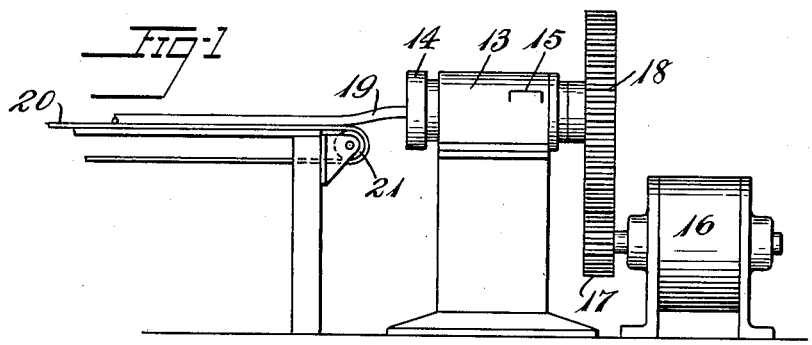
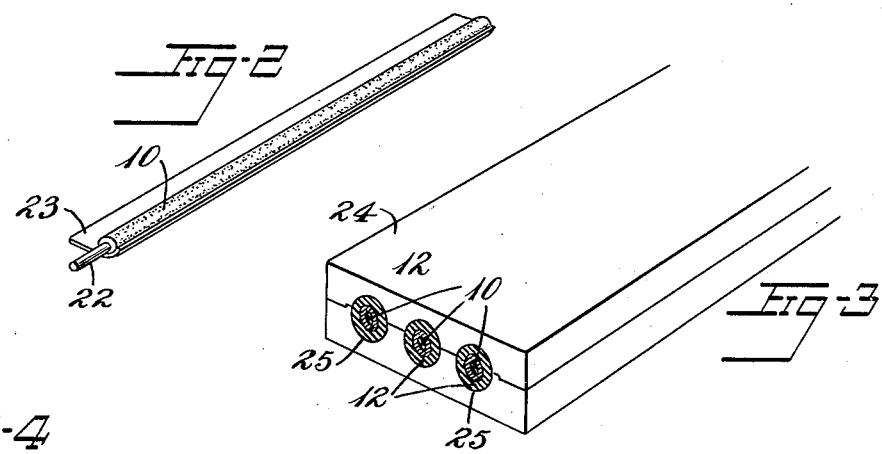
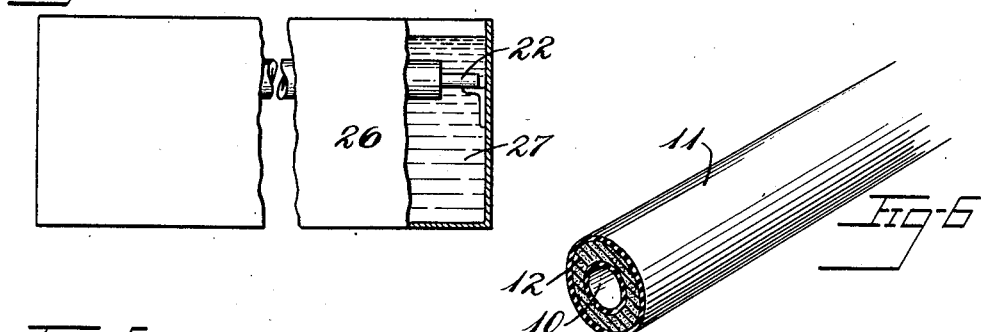
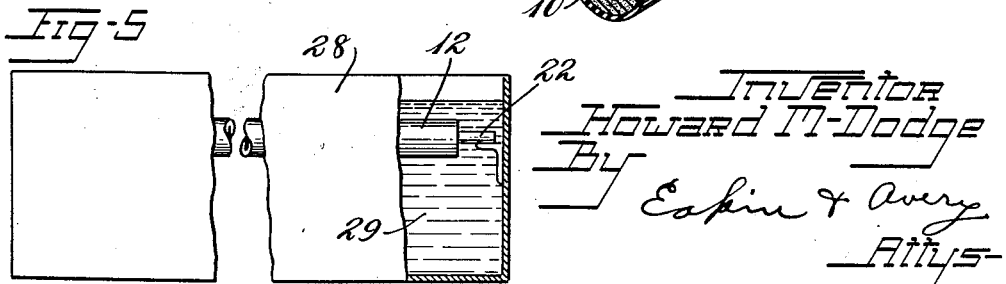

Patented Mar. 29, 1938

2,112,737

UNITED STATES PATENT OFFICE 2,112,737

SURGICAL DRAINAGE TUBE

Howard M. Dodge, Akron, Ohio, assignor to The B. F. Goodrich Company, New York, N. Y., a corporation of New York Original application June 8, 1934, Serial No. 729,661, now Patent No. 2,023,268. Divided and this application October 25, 1935, Serial No. 46,723

2 Claims. (Cl. 128—350)

This invention relates to rubber strip material comprising sponge rubber. This application is a division of my application Ser. No. 729,661, filed June 8, 1934, now Patent No. 2,023,268.

The principal objects of the invention are to provide an article having a cushioning body of sponge rubber and a tough, thin impervious and elastic cover of soft solid rubber. Other objects will appear from the following description and the accompanying drawing.

In the drawing:

Fig. 1 is a side view of an extruding machine, illustrating one step in the production of a strip article.

Fig. 2 is a perspective view illustrating another step in the method.

Fig. 3 is a perspective view of a mold with the strips therein.

Fig. 4 is a view of a coagulant dip tank with an article suspended therein.

Fig. 5 is a view of a tank for applying a rubber coating to an article.

Fig. 6 is a perspective view of a length of rubber tubing, being one of the articles made according to the invention.

Referring to the drawing, it is often desired to produce a strip of rubber material having extremely soft and deformable walls but impervious to moisture and having relatively high tensile strength or resistance to stretching. For example drainage tubing, for use in surgical operations must have impervious surfaces and be relatively stiff, yet it is desirable that the walls of the tubing be soft so as not to irritate delicate tissues. Such a tube may be made according to this invention as shown in Fig. 6, wherein the inner surface 10 and outer surface 11 are formed of flexible impervious rubber and an intermediate layer 12 of soft sponge or cellular rubber is provided.

It is also desirable to provide glass-run channel, header strips, and similar strip material, used in the manufacture of automobiles and refrigerators, where such strip materials are used as sealing strips, with great resistance to stretch, imperviousness to moisture, and low resistance to lateral distortion and compression.

In either case my invention contemplates the provision of a rubber core member which may conveniently be extruded as illustrated in Fig. 1, where the numeral 13 designates the cylinder and 14 the extruding die through which plastic rubber material introduced at 15 may be forced into strip form by the motor 16 acting through the gears 17 and 18. The strip, which for example may be the tubular core 10 of the tube of Fig. 6, or a strip, U-shape in section, where the strip is to be used as a channel, is shown at 19 and passes from the machine to a travelling apron 20 supported by a pulley 21.

Where the core element 10 is of tubular form it may then be blown onto a mandrel 22 for convenience in handling, as shown in Fig. 2. A previously prepared strip of unvulcanized sponge rubber composition 23 is now applied over the surface of the core, whether the core is supported upon a mandrel or not, the core first being cleaned of dust as by sponging it with a rubber solvent.

The core covered with sponge rubber composition is then placed in a mold 24 as illustrated in Fig. 3. The mold cavities 25 are larger than the covered core to provide space for expansion of the sponge rubber composition. Heat is applied to vulcanize the core and to cause the sponge rubber composition to expand and fill the mold cavity where it becomes vulcanized.

After vulcanization, which may be complete or only partial, the facing 11 of impervious rubber is applied. This is preferably accomplished by applying a coating of a rubber coagulant and then depositing thereon rubber from an aqueous dispersion thereof. For this purpose the strip may be first immersed in a tank 26 containing a coagulant solution 27. The strip preferably is then completely or partially dried and is then immersed in a tank 28 containing an aqueous dispersion of rubber 29, either natural latex or an artificial dispersion.

After the impervious coating 11 has been applied the strip is subjected to further vulcanization at a low temperature and preferably while unconfined. This may be accomplished in a heated oven. By vulcanizing at a relatively low temperature, further blowing of the sponge rubber compound is avoided.

When surgical drainage tubing, such as is illustrated in Fig. 6, is made by this method the tube comprising the core has sufficient support to prevent its collapsing in use. The sponge rubber provides a soft cushion and the pliable impervious cover provides a smooth non-irritating surface to contact with the tissues.

I claim:

1. A surgical drainage tube comprising a tubular lining of vulcanized rubber, a soft cushion of sponge rubber thereabout, and a covering of thin pliable impervious vulcanized rubber adapted to seal the surface of the rubber cushion without appreciably detracting from its cushioning properties.

2. A surgical drainage tube as defined by claim 1 in which the impervious covering comprises material having the characteristics of rubber deposited from a liquid dispersion of rubber.

HOWARD M. DODGE.